United States Patent [19]

Jackson

[11] 4,277,526
[45] Jul. 7, 1981

[54] PROTECTIVE AND DECORATIVE MOLDING HAVING FOAM-FILLED CHANNEL

[75] Inventor: Norman C. Jackson, Livonia, Mich.

[73] Assignee: The Standard Products Company, Dearborn, Mich.

[21] Appl. No.: 46,906

[22] Filed: Jun. 8, 1979

Related U.S. Application Data

[63] Continuation of Ser. No. 870,027, Jan. 16, 1978, abandoned.

[51] Int. Cl.³ .................. B32B 3/30; B32B 5/18; B32B 7/04; B60R 13/04; E04F 19/02
[52] U.S. Cl. .................................. 428/31; 52/716; 293/1; 293/128; 428/358
[58] Field of Search ............. 428/358, 397, 31; 293/1, 128; 52/716

[56] References Cited

U.S. PATENT DOCUMENTS

| 3,013,919 | 12/1961 | Bialy . | |
| 3,380,193 | 4/1968 | Hill . | |
| 3,472,546 | 10/1969 | Samuels . | |
| 3,543,465 | 12/1970 | Jackson | 483/31 |
| 3,843,475 | 10/1974 | Kent . | |
| 3,916,055 | 10/1975 | Wagner . | |
| 3,938,795 | 2/1976 | Haar . | |
| 3,982,780 | 9/1976 | Keith . | |
| 4,010,297 | 3/1977 | Wenrick | 483/31 |

FOREIGN PATENT DOCUMENTS

| 1032679 | 6/1966 | United Kingdom . |
| 1278503 | 6/1972 | United Kingdom . |
| 1362516 | 8/1974 | United Kingdom . |
| 1380255 | 1/1975 | United Kingdom . |
| 1428811 | 3/1976 | United Kingdom . |

Primary Examiner—James C. Cannon
Attorney, Agent, or Firm—Harness, Dickey & Pierce

[57] ABSTRACT

A protective and decorative molding for attachment to structures such as the sides of automobiles. The molding has an elongated channel-shaped plastic member, a foam which fills and extends beyond the inner channel of the plastic member, and a means for bonding the molding to an automobile body.

10 Claims, 2 Drawing Figures

PROTECTIVE AND DECORATIVE MOLDING HAVING FOAM-FILLED CHANNEL

This is a continuation, of application Ser. No. 870,027, filed Jan. 16, 1978, now abandoned.

BACKGROUND AND SUMMARY OF THE INVENTION

This invention relates to trim strips or molding strips which can be attached to structures for decorative and protective purposes. The trim or molding strips of this invention are especially suitable for use in protecting and decorating vehicles such as automobiles. As used hereinafter, the term "molding" will be used with the understanding that it includes both molding strips and trim strips.

Moldings have been used for many years to improve the appearance and protect structures such as automobiles. Molding attached to the side of an automobile is particularly effective to protect the automobile from damage such as might occur when the door of an adjacent automobile is carelessly swung open. Moldings used to protect the exterior of automobiles are generally subjected to considerable abuse which includes not only the aforementioned contacts but also exposure to temperature extremes, wind, rain, ice and snow. Yet suitable automobile moldings are expected to maintain their appearance and protect the automobile for long periods of use through many seasonal changes. To provide satisfactory service, moldings must last for years without pulling away from the side of the automobile to which they are attached. Also, moldings must be hard enough to resist but soft enough to cushion a moderate blow directed against them in order to protect the finish of the automobile to which they are attached.

Thus, it is difficult to fully meet all of the requirements for such moldings. The prior art includes several patents reflecting efforts to develop moldings having improved characteristics. Examples include U.S. Pat. Nos. 3,543,465, Dec. 1, 1970 to Jackson; 3,982,780, Sept. 28, 1976 to Kieth; 3,916,055, Oct. 28, 1975 to Wagner; 3,380,193, Apr. 30, 1968 to Hill; 3,472,546, Oct. 14, 1969 to Samuels; 3,843,475, Oct. 22, 1974 to Kent; and 3,938,795, Feb. 17, 1976 to Haas.

There is a continued need, however, to develop improved moldings which are light in weight, are made from inexpensive materials, and are able to serve both decorative and protective functions well. The objects of this invention are to provide moldings having these characteristics. These and other objects and advantages of the present invention will be apparent from the following disclosure.

It has been found that improved functional and decorative moldings can be made comprising: an elongated channel-shaped plastic member; a light-weight, pliant foam filling and extending beyond the inner space of the channel-shaped plastic member, and a means for attaching the molding to a supporting structure such as an automobile. Suitable attachment means include, for example, a pressure sensitive adhesive coating on the foam surface extending beyond the elongated, channel-shaped plastic member. The molding can have a decorative layer, such as a metalized plastic film, attached to or imbedded in the outer surface of the channel-shaped plastic member. The outer surface of the plastic member and decorative layer are preferably covered by an additional layer of protective clear plastic material. The molding of the present invention is an economical, practical, light-weight molding serving both decorative and protective functions.

DESCRIPTION OF THE INVENTION

Figure 1:
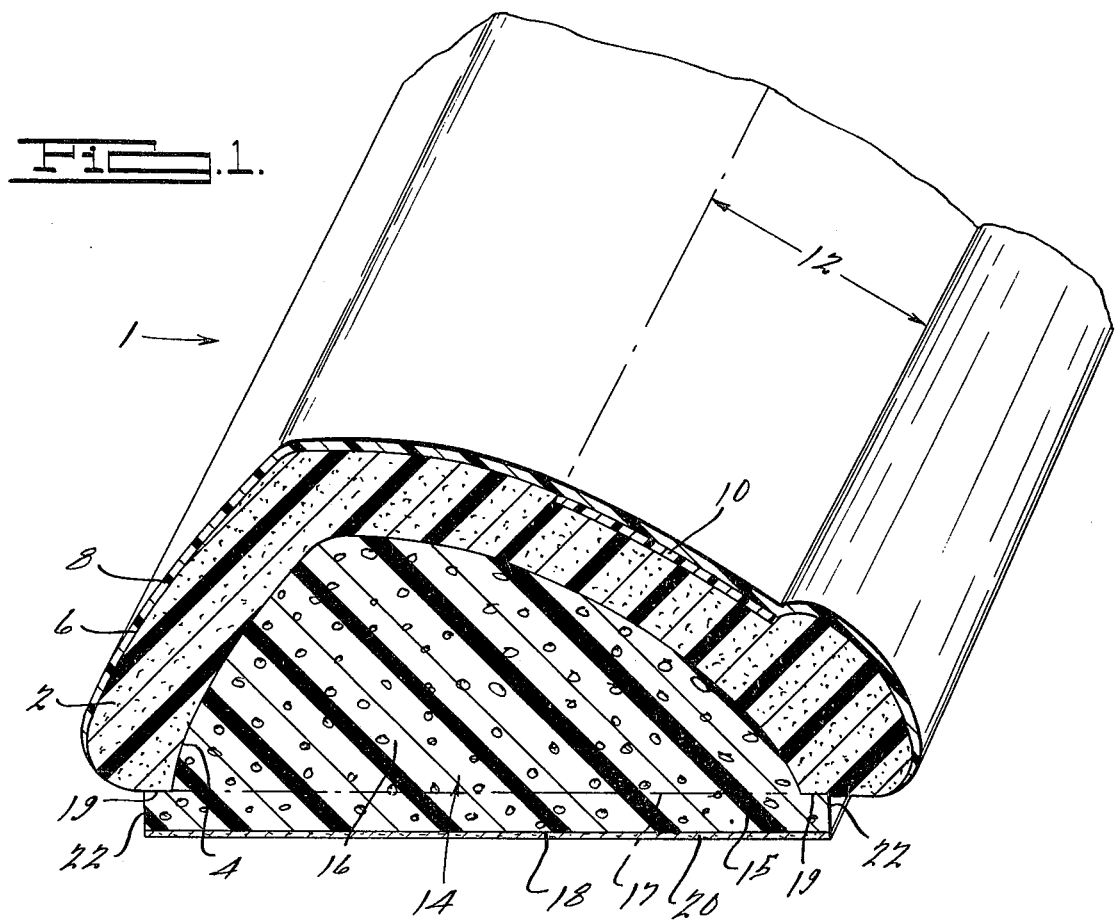
FIG. 1 is a perspective view, broken away and in section, of a molding of the present invention.

Referring now to the drawing, FIG. 1 illustrates a molding of the present invention, indicated generally by reference numeral 1. The molding shown in FIG. 1 comprises a channel-shaped, elongated member 2 made of a rigid or semi-rigid plastic material such as polyvinyl chloride, and having an inner surface 4 and an outer surface 6. Outer surface 6 is covered by a thin, clear layer 8 which can be made of, for example, a vinyl compound or an ionomeric resin such as "Surlyn" available commercially from E. I. duPont de Nemours & Co. Layer 8 also covers decorative film 10 which is imbedded in elongated member 2 to provide a metallic appearance to a portion 12 of outer surface 6 and which may be any of the several decorative films such as metal foil or metalized plastic film well known in the art. Although not shown in the drawing, layer 8 may itself be covered with a thin layer of acrylic resin which provides additional protection against, for example, ultra-violet light.

Foam 16 is a light-weight, pliant and flexible foam such as polyurethane foam and is bonded or otherwise fixedly attached to inner surface 4 of elongated member 2. Foam 16 locates within and slightly beyond the inner space of channel-shaped elongated member 2, generally indicated by numeral 14. As illustrated in FIG. 1, the term "inner space" refers to the interior volume enclosed within channel-shaped elongated member 2 and an elongated imaginary plane 17 which extends across the opening of the channel-shaped, elongated member. While elongated member 2 provides structural strength to the molding 1, foam 16 both fills the inner space 14 of elongated member 2 and provides a substantially flat or planar surface 18 to which adhesive layer 20 is attached.

A portion 15 of foam 16 extends beyond the inner space of channel-shaped elongated member 2 thereby forming shoulders 22, and extends outwardly to form shoulders 19 which facilitate the sealing of inner surface 4 from outside elements which might affect the bond between inner surface 4 and foam 16. The substantially planar surface 18 of foam 16 has an adhesive layer 20 thereon for attaching the molding 1 to the side of an automobile. It is an advantage of the present invention that because foam 16 is a soft, pliant material extending beyond inner space 14 of elongated member 2, there is no need for a cushioning layer between adhesive 20 and foam 16, and adhesive 20 can be applied directly to foam 16 which serves, itself, to cushion planar surface 18 and allow it to conform to an irregular surface for bonding. Also foam 16 extends beyond inner space 14 to facilitate the use of a pressure sensitive adhesive as adhesive 20. Thus, when molding 1 is pressed against the side of an automobile, foam 16 is compressed, thereby evenly distributing the pressure on the adhesive between the automobile and substantially planar surface 18 to best effect adhesion by adhesive 20. Also foam 16 provides a resilient cushioning effect with respect to the side of an automobile when channel-shaped elongated member 2 is struck by a moderate blow such as that which might result from the opening of a door of an adjacent automobile.

Channel-shaped elongated member 2 can be made, for example, by extrusion, of any suitable plastic material by which is meant a material which is durable and sufficiently strong to resist damage resulting from, e.g. car door edges. The plastic material should have elastic memory so that indentations from moderate impact will soon disappear. It has been found preferable to employ a plastic having a hardness of from about 80 Shore A to about 55 Shore D (15 Sec. delay ASTM). Suitable plastic materials meeting these requirements are well known in the art and include polyvinyl chloride plastic generally referred to as PVC. Of course, the plastic material can contain plasticizers, pigments, and other additives to improve the properties or appearance of the material.

Foam 16 is a light-weight, pliant and flexible foam such as a poly-urethane foam which can be made by reacting a polyol with an isocyanate in the presence of a catalyst and a blowing agent. Generation of foam, in situ, in the inner space 14 of elongated member 2 offers an advantage in that the foam material will tend to bond to inner surface 4 of channel-shaped elongated member 2 during the reaction. Of course, a primer of adhesive might also be used to coat inner surface 4 for a stronger bond. Shoulders 22 and substantially planar surface 18 of foam 16 can be made by suitably confining the foam during the foam generation step or by cutting away excess foam material to form shoulders 22 and substantially planar surface 18.

Suitable adhesive materials for adhesive layer 20 are commercially available and are those well known in the art. For ease of application and to take best advantage of the present invention, pressure sensitive adhesives are preferred.

Figure 2:
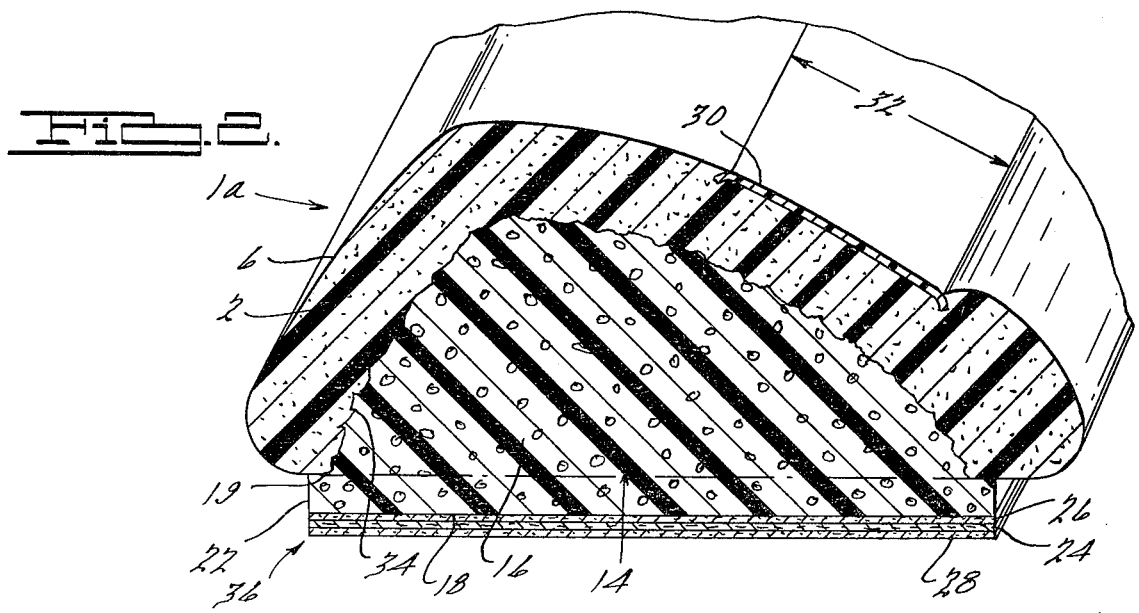
FIG. 2 is a perspective view, broken away and in section, of an alternative embodiment of a molding of the present invention.

Now referring to FIG. 2, an alternative embodiment of the present invention, generally indicated by numeral 1a, is shown wherein channel-shaped elongated member 2 has an outer surface 6 without any protective layer thereon and an inner surface 34 characterized by an irregular and uneven surface. It is contemplated that the irregular nature of inner surface 34 will serve to increase the bonding strength between foam 16 and channel-shaped elongated member 2 by providing a multiplicity of angles and increasing the surface area therebetween. Shown with edges imbedded in outer surface 6 of elongated channel 2 is decorative film 30 which may be a polyvinylfluoride film such as is commercially available under the trade name "Tedlar" from E. I. du Pont de Nemours & Co. and which presents a decorative surface 32 to enhance the visual impression of molding 1a. A double faced tape, generally indicated at 36, having film layer 24 sandwiched between adhesive layers 26 and 28, is bonded to planar surface 18 of foam 16 by means of adhesive layer 26. Adhesive layer 28, which is preferably a pressure sensitive adhesive, is employed to attach molding 1a to the exterior surface of, for example, an automobile.

Moldings made in accordance with the present invention can be used not only to protect the sides of automobiles but also to protect the trunk lid or roof of automobiles or vans as luggage strips. The moldings can also be used as fascias for the rear or front of automobiles or vans. Furthermore, while the description of the present invention has been largely in the context of its application to automobiles, it will be readily apparent to those skilled in the art that the moldings of this invention would be usefully applied to other vehicles as well as other structures such as appliances and the like. While a specific form of this invention has been described and illustrated herein, it is to be understood that the invention may be varied within the scope of the appended claims without departing from the spirit of the invention.

What is claimed is:

1. A protective and decorative molding including an elongated, channel-shaped member comprising a plastic semi-rigid elastic material and having an inwardly facing surface defining an inner space, said inwardly facing surface being an uneven and irregular surface; a lightweight flexible, pliant foam bonded by surface attachment to said inwardly facing surface, said foam completely filling and extending beyond the inner space of said channel-shaped member, said foam presenting a generally planar surface adapted for attachment to a structural surface and said foam being compressible to substantially evenly distribute pressure against said structural surface and to provide a cushion between said channel shaped member and said structural surface; and means for attaching said generally planar surface of said foam to said structural surface.

2. A molding as recited in claim 1 wherein said means for attaching said generally planar surface of said foam is a layer of pressure sensitive adhesive.

3. A molding as recited in claim 1 wherein said means for attaching said generally planar surface of said foam is double faced pressure sensitive tape.

4. A molding as recited in claim 1 wherein said elongated channel-shaped member is made of polyvinyl chloride and said flexible, pliant foam is made of polyurethane foam.

5. A molding as recited in claim 1 wherein said elongated, channel-shaped member has a hardness of from about 80 Shore A to about 55 Shore D.

6. A molding as recited in claim 1 having an outwardly facing surface with a decorative layer on at least a portion thereof selected from the group consisting of metal foil, metalized plastic film, and polyvinylfluoride film.

7. A molding as recited in claim 6 wherein said decorative layer of said molding has a layer of clear vinyl thereover.

8. A molding as recited in claim 6 wherein said decorative layer of said molding has a layer of ionomeric resin thereover.

9. A molding as recited in claim 6 wherein said channel-shaped member has opposite side walls, each having, in cross section, an end portion and said foam extends over at least a portion of each of said end portions and is surface bonded thereto.

10. A molding adapted to protect and decorate a supporting structural surface comprising an elongated, channel-shaped plastic member comprising a relatively incompressible elastic material and having an inwardly facing surface defining an inner space; a relatively compressible foam filling and extending outwardly and beyond the inner space of said channel-shaped member, said foam bonded by surface attachment to the inner surface of said plastic member, said inner surface being an uneven and irregular surface; and adhesive means for attaching said foam to said supporting structural surface.

* * * * *